Oct. 11, 1966 M. I. BEHR ET AL 3,278,838

MAGNETIC MEANS FOR DETECTING VARIATIONS IN THE EDGE, WIDTH AND/OR STRAIGHTNESS OF MOVING MEMBERS

Filed July 20, 1962 2 Sheets-Sheet 1

INVENTORS.
MICHAEL I. BEHR
DONALD D. LARSON
ROBERT A. SMITH

BY Christie, Parker & Hale
ATTORNEYS.

INVENTORS.
MICHAEL I. BEHR
DONALD D. LARSON
ROBERT A. SMITH
BY
Christie, Parker & Hale
ATTORNEYS.

United States Patent Office 3,278,838
Patented Oct. 11, 1966

3,278,838

MAGNETIC MEANS FOR DETECTING VARIATIONS IN THE EDGE, WIDTH AND/OR STRAIGHTNESS OF MOVING MEMBERS

Michael I. Behr, South Pasadena, Donald D. Larson, Glendora, and Robert A. Smith, Lynwood, Calif., assignors to Burroughs Corporation, Detroit, Mich., a corporation of Michigan Filed July 20, 1962, Ser. No. 211,290
13 Claims. (Cl. 324—34)

Figure 1:
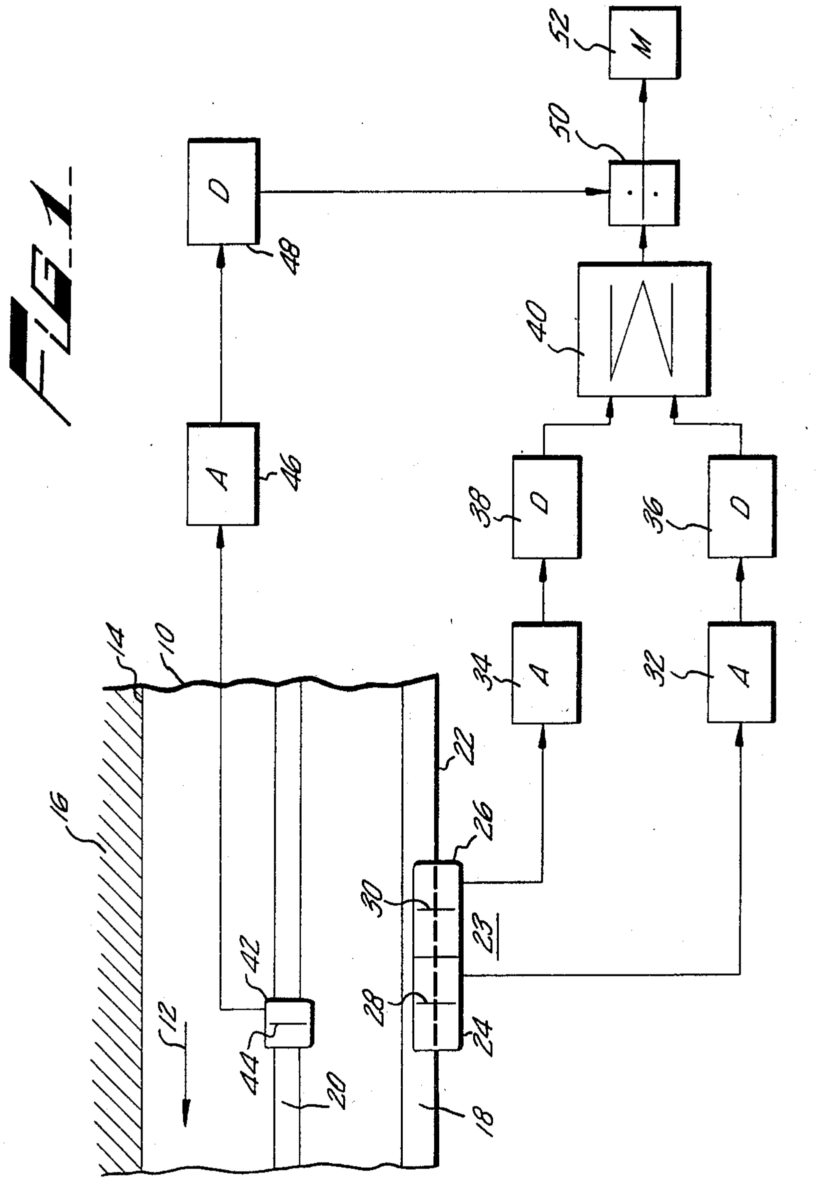

The present invention relates to a novel apparatus employing magnetic sensor means for detecting variations in edge, width, and/or straightness of moving members.

In many industrial processes it is desirable to detect and/or control variations in edge, width, and/or straightness of a moving member. The manufacture of magnetic recording tape is one such industrial process.

As is commonly known, information is recorded on magnetic tape along parallel recording tracks aligned with an edge of the tape. The information is read from the magnetic tape by guiding the tape under a set of fixed magnetic heads, one associated with each recording track. Thus variation in the edge of the surfaces, width, and straightness of the magnetic tape not only presents problems in providing straight line guiding of the magnetic tape but also allows occasional bits of information to be missed or misread by the magnetic read heads. Accordingly, it is extremely important that the magnetic tape employed in the recording and reading of signal information and particularly in high speed computer systems, have smooth continuous edges and a uniform width and straightness.

In an attempt to eliminate from use any tape which does not meet the above requirements, quality control checking apparatus has been developed which detects variations in tape edge, width, and straightness. In the past, such apparatus has employed relatively complex circuitry and an arrangement of photosensitive elements. Variations in the edge and/or width of a magnetic tape moving between the photoelectric elements and a light source modulate the amount of light and hence the amplitude of a signal developed by the photosensitive elements. Thus, variations in the amplitude of the electrical signals provide an indication of the magnitude of variation in the edge of the surface and width of the moving magnetic tape.

Although such photosensitive apparatus is useful in detecting slow, relatively long variations in tape edge and width, the photosensitive elements are usually incapable of detecting and responding to small, rapid changes in tape edge and width. In addition, such photosensitive elements are subject to detection errors due to extraneous light striking the photosensitive elements.

In view of the above, the present invention provides an improved apparatus for detecting variations in the edge of the surface, width and straightness of a moving member which is simple in design, accurate in operation, and extremely sensitive even to small, rapid variations in the edge of the surface of the moving member.

Basically, to accomplish this, the present invention provides a magnetic sensor for developing an electrical signal which varies in amplitude with changes in the width of a magnetic recording track disposed along the moving member and sensed by the magnetic sensor. By aligning an edge of the surface of the recording track with an edge of the moving member, and by positioning the magnetic sensor to overlap the aligned edge, variations in the edge of the moving member produce a corresponding variation in the width of the recording track moving under the magnetic sensor and hence a proportional variation in the amplitude of the electrical signal developed by the sensor. The variation in the amplitude of the electrical signal thus provides a direct indication of variations in the edge of the surface of the moving member.

Applying the basic detection technique described above to apparatus for detecting variations in the width of a magnetic tape, a pair of alternating signals are recorded on the magnetic tape upon two recording tracks. The first recording track has an edge aligned with one edge of the magnetic tape while the second recording track has an edge aligned with an opposite edge of the magnetic tape. Associated with the first and second recording tracks, respectively, is a first and second magnetic read head. Each magnetic read head is positioned such that its air gap extends over a portion of its associated recording track and overlaps the aligned edge thereof to produce an electrical signal in response to the electrical signal recorded upon the recording track passing thereunder. The electrical signals developed by the magnetic read heads vary in amplitude with variations in the width of the recording track passing thereunder and hence with variations in the respective edges of the moving magnetic tape. The electrical signals thus formed are added in a summing network to develop a resultant signal which varies in magnitude with variations in the width of the moving magnetic tape.

The resultant signal may be applied to a meter or scope for visual display or may be utilized in the cutting process of the magnetic tape as a feedback control signal to control the position of the cutting or guiding elements to compensate for variations in the width of the magnetic tape as it is cut.

Figure 2:
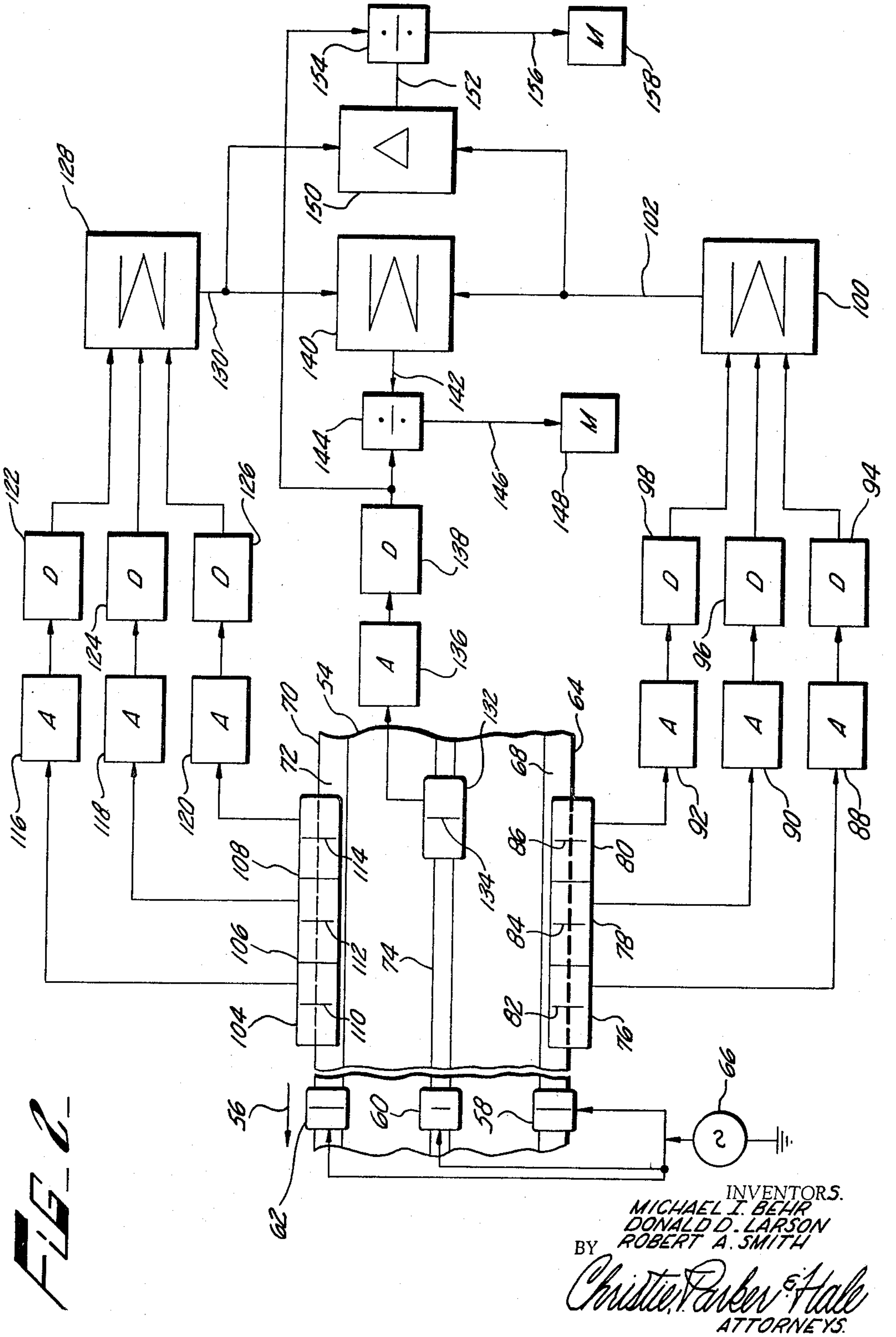

The above, as well as other features of the present invention, may be more clearly understood by reference to the following detailed description when considered with the drawings, in which:

FIGURE 1 is a schematic, block diagram representation of one form of the apparatus of the present invention utilized in detecting variations in the edge of the surface of a moving magnetic tape; and FIGURE 2 is a schematic, block diagram representation of the apparatus of the present invention utilized in detecting variations in the width and straightness of a moving magnetic tape.

Referring in detail to FIGURE 1, there is illustrated a segment of magnetic tape 10 which is being driven from right to left as indicated by the arrow 12 by conventional tape driving means, not specifically shown. An edge 14 of the tape 10 is guided by a guide member 16. Disposed along the surface of the magnetic tape 10 is a pair of magnetic recording tracks represented as 18 and 20 having a constant frequency signal recorded thereon. The recording track 18 extends along an edge 22 of the magnetic tape 10. Thus, one edge of the recording track 18 is aligned with an edge of the surface of the magnetic tape 10.

Positioned over the recording track 18 and overlapping the edge 22 of the magnetic tape 10 is a first magnetic sensor means 23. By way of example, the magnetic sensor means includes a pair of closely spaced magnetic read heads 24 and 26. The magnetic read heads 24 and 26 include air gaps represented as 28 and 30, respectively, which extend over a portion of the recording track 18 and overlap the edge 22 of the magnetic tape 10. The magnetic read heads 24 and 26 are arranged to develop electrical signals in response to the signal recorded on the recording track 18.

As is commonly known in the magnetic recording art the magnitude of an electrical signal produced by a magnetic read head is directly proportional to the width of the recording track passing under the air gap of the magnetic head. Thus, the amplitude of the electrical signals developed by the magnetic heads 24 and 26 are directly proportional to the width of the recording track 22 passing thereunder. Accordingly, variations in the edge 22 of the tape 10 produce variations in the width of the recording track 18 passing under the magnetic heads 24 and 26 which, in turn, produce corresponding variations in the amplitude of the electrical signals developed by the magnetic read heads 24 and 26 to provide an indication of the variations in the edge 22.

In addition, since the edge 14 of the tape 10 is guided against the fixed guide 16, variations in the width of the tape 10 produce variations in the width of the recording track passing under the magnetic read heads 24 and 26 such that the electrical signals produced thereby in the embodiment of FIGURE 1 provide an accurate indication of variations in the width of the magnetic tape 10.

The electrical signals generated by the magnetic read heads 24 and 26 are applied to amplifiers 32 and 34, respectively. The electrical signals are then amplitude demodulated in demodulators 36 and 38 to develop varying D.C. signals. The demodulated electrical signals are applied to a summing network 40 which adds the demodulated electrical signals on a continuous time basis to develop a sum signal indicative of variations in the width of the tape 10 as it passes under the magnetic read heads 24 and 26.

Theoretically the sum signal can be utilized directly to provide a means for detecting variations in the width of the moving tape 10. However, in practice, variations in tape speed, imperfections in the thickness of the magnetic material forming the recording surface of the magnetic tape, and variations between the speed at which the constant frequency signals are recorded and played back introduce undesired proportional variations in the magnitude of the output signals which necessitate compensation. The recording track 20 is utilized to provide such compensation.

Positioned over the recording track 20 is a magnetic read head 42. The magnetic read head 42 includes an air gap 44 which extends over and to either side of the recording track 20. The width of the recording track 20 is such that the entire recording track continuously passes under the air gap 44 irrespective of variations in the width and edge surfaces of the magnetic tape 10. The magnetic read head 42 is arranged to develop an electrical signal in response to the signal recorded on the recording track 20. Since the entire recording track 20 continuously passes under the air gap 44, any variations in the amplitude of the electrical signal developed by the magnetic read head 44 are due to speed variations and/or variations in the thickness of the magnetic material forming the recording surface of the magnetic tape 10.

The electrical signal developed by the magnetic read head 42, which may be termed the control signal, is applied to an amplifier 46 which amplifies the control signal. The amplified control signal is demodulated by an amplitude demodulator 48 and applied to an analog division circuit 50 to compensate for the undesired variations in the sum signal, which is also applied to the division circuit 50.

The division circuit 50 may take a number of different forms. For example, it may include a multiplier circuit and an inverter in which the sum signal is applied to one input terminal of the multiplier and the control signal is applied to the inverter and then to the multiplier to develop a resultant output signal. Such a circuit, as well as other possible combinations to provide analog division, are discussed in chapter 23 of the Handbook of Automation Computation and Control, volume 2, by Grabbe, Ramo, and Woolridge, published in 1959 by John Wiley and Sons, Inc.

Since the amplitude of the signal developed by the magnetic read heads, and hence the sum signal, is a product function of tape speed, track width and coating thickness, variations in these parameters appear as undesired varying product components in the sum signal. Accordingly, since the magnitude of the control signal is due to variations in tape speed and coating thickness, a division of the sum signal by the control signal cancels out the undesired product components of signal magnitude in the sum signal to provide a resultant output signal, variations in the amplitude of which provide an accurate indication of variations in the edge of the surface and width of the tape 10 as it passes under the magnetic read heads 24 and 26. As illustrated, the resultant output signal may then be applied to a meter 52 or a display device such as a cathode ray tube to provide a visual indication of the variations in the width of the tape 10.

Although not specifically shown, the resultant output signal may be also utilized in a servo control system to control, for example, either the cutting or guiding elements in the manufacture of strips of magnetic tape.

In addition to detecting variations in the width of a moving member such as magnetic tape it may be desired to detect variations in the straightness thereof. A system for detecting both variations in width and straightness of a moving magnetic tape is illustrated by the schematic, block diagram representation of FIGURE 2.

FIGURE 2 illustrates a broken segment of a strip of magnetic tape 54. The magnetic tape 54 is driven by conventional tape driving means (not specifically shown) from right to left as indicated by the arrow 56. Positioned over the recording surface of the magnetic tape 54 are three magnetic recording heads 58, 60 and 62. The magnetic recording head 58 is positioned along an edge 64 of the magnetic tape 54 to record a constant frequency signal generated at a signal source 66 on a recording track 68 at the edge 64 of the tape 54. Similarly, the magnetic read head 62 is positioned over the recording surface of the tape 54 along an edge 70 to record the constant frequency signal on a recording track 72 extending along the edge 70. The magnetic recording head 60 is positioned along a central portion of the recording surface of the magnetic tape 54 to record the constant frequency signal along a third or control recording track 74.

Positioned along the recording track 68 is a first magnetic sensor means comprising a plurality of closely spaced magnetic read heads 76, 78 and 80. The magnetic read heads include means defining air gaps 82, 84 and 86, respectively. The air gaps are positioned to extend over a portion of the recording track 68 and to overlap the edge 64 of the tape 54. The magnetic read heads 76, 78 and 80 are each arranged to develop an electrical signal in response to the signal recorded on the recording track 68. As described in connection with FIGURE 1, the amplitude of the electrical signal developed by each of the magnetic read heads 76, 78 and 80 varies directly with variations in the width of the recording track passing under its associated air gap.

The electrical signals developed by the magnetic read heads 76, 78 and 80 are applied to and amplified by amplifiers 88, 90 and 92, respectively. The amplified electrical signals, in turn, are demodulated by amplitude demodulators 94, 96 and 98, the outputs of which are coupled to a summing network 100. The demodulated electrical signals are added on a continuous time basis in the summing network to develop a sum signal at an output terminal 102 of the summing network 100.

Similarly, positioned over the recording track 72 is a second magnetic sensor means comprising a plurality of magnetic read heads 104, 106 and 108. The magnetic read heads are aligned opposite to the read heads 76, 78 and 80 and are arranged to include air gaps 110, 112 and 114, respectively. The air gaps extend over a portion of the recording track 72 and overlap the edge 70 of the magnetic tape 54. In this manner the electrical signals developed by the magnetic read heads 104, 106 and 108 very in amplitude with variations in the edge 70 of the magnetic tape 54.

The electrical signals developed by the magnetic read heads 104, 106 and 108 are applied to and amplified by amplifiers 116, 118 and 120 and, in turn, are demodulated in amplitude demodulators 122, 124 and 126, respectively. The demodulated electrical signals are added on a continuous time basis in a summing network 128 to develop a sum signal at an output terminal 130.

Positioned over the control track 74 is a third magnetic sensor comprising a magnetic read head 132. The magnetic read head 132 is arranged to have an air gap 134 extending over and to either side of the control track 74 such that the entire width of the control track at all times passes under the air gap 134. The magnetic read head 132 thus arranged develops an electrical signal which varies in amplitude in response to variations in the speed and thickness of the magnetic recording surface of the magnetic tape 54. The electrical signal generated by the read head 132, which may be termed the control signal, is amplified by an amplifier 136 and demodulated in an amplitude demodulator 138.

The sum signal developed at the output terminal 102 of the summing network 100 provides an indication of variations in the edge 64 of the magnetic tape 54 as it passes thereunder. Similarly, the sum signal developed at the output terminal 130 of the summing network 128 provides an indication of the variations in the edge 70 of the magnetic tape 54 as it passes thereunder. By aligning the first plurality of magnetic heads 76, 78 and 80 with the second plurality of magnetic heads 104, 106 and 108 and by adding the two sum signals in a summing network 140 a resultant sum signal is developed at an output terminal 142 which provides an indication of variations in the width of the moving tape 54. For example, if both of the sum signals decrease in amplitude in response to a reduction in the width of the recording tracks 68 and 72 passing under the associated read heads, the magnitude of the resultant sum signal also decreases to indicate a reduction in the width of the magnetic tape 54. Conversely an increase in the amplitude of the sum signals results in an increase in the magnitude of the resultant sum signal to indicate an increase in the width of the magnetic tape.

As described in connection with FIGURE 1, however, the amplitude of the electrical signals developed by the plurality of magnetic read heads, in addition to varying with changes in the width of the recording track passing thereunder, is also subject to variations due to changes in the speed of the moving tape 54, variations in the thickness of the magnetic surface of the magnetic tape 54 and differences between the speed of the magnetic tape 54 at which the constant frequency signals are recorded on the recording tracks 68, 70 and 74 and the speed at which the tape is moving when it passes under the plurality of magnetic read heads. To compensate for such variations the resultant sum signal is applied to a divider circuit 144 which also receives the demodulated control signal. The resultant sum signal is divided by the demodulated control signal in the divider circuit 144 to develop the resultant output signal at an output terminal 146 which is a true indication of variations in the width of the tape 54. The resultant output signal may then be applied to a meter 148 for recording or displaying the variations in the width of the magnetic tape.

In order to detect variations in the straightness of the magnetic tape, such as warpage, the sum signals developed at the output terminals 102 and 130 are subtracted in a subtracting network 150 to develop an output signal at an output terminal 152. Thus, if the sum signal at the output terminal 102 decreases to represent a reduction in the width of the magnetic recording track 68 passing under the magnetic read heads 76, 78 and 80 while the electrical sum signal at the output terminal 130 increases due to an increase in the width of the recording track 72 passing under the magnetic read heads 104, 106 and 108, a resultant signal is developed at the output terminal 152 of the subtractor network 150 which provides an indication that a variation in the direction or straightness is occurring in the tape 54.

To compensate for variations in the magnitude of the output signal at the output terminal 152 due to variations in velocity of the tape 54, etc. the resultant signal is applied to a divider network 154 and divided by the control signal from the demodulator 138. Thus, as previously described, a resultant output signal is developed at the output terminal 156 which provides a true indication of variations in the straightness of the moving magnetic tape 54 which may be applied to a meter 158 for recording or visual display of the actual variations in the straightness of the moving tape 54.

Accordingly, by utilizing the arrangement illustrated in FIGURE 2, variations in both the width and straightness of the moving magnetic tape may be accurately detected, recorded and displayed. In addition, the resultant output signals may be utilized in a servo control system to control the cutting of the magnetic tape to produce tape of uniform width and straightness.

What is claimed is:

1. Apparatus for detecting variations in an edge of a surface of a moving member, comprising:

a magnetic recording track on the surface of the moving member having one alternating signal recorded thereon, an edge of the recording track being coincident with the edge of the surface of the moving member;

magnetic sensor means extending laterally over a limited portion of the recording track width and extending beyond the edge of the moving member for producing an electrical signal in response to the signal recorded on the recording track, the amplitude of the electrical signal being proportional to the portion of the recording track passing directly under the sensor means;

and means for detecting variations in the amplitude of the alternating electrical signal produced by the sensor means to provide an indication of variations in the edge of the moving member.

2. Apparatus for detecting variations in an edge of a surface of a moving member having an alternating signal recorded on a magnetic recording track, one edge of the track being defined by the edge of the moving member, comprising:

a plurality of closely spaced magnetic read heads each having an air gap extending laterally over a limited portion of the recording track and extending beyond the edge of the surface for producing a plurality of electrical signals in response to the signal recorded on the recording track;

and means for combining the plurality of electrical signals to produce an average signal, variations of the magnitude of which provide an accurate indication of lateral variations in the edge of the surface of the moving member.

3. The apparatus defined in claim 2 including a control magnetic recording track disposed along the moving member and having an alternating signal recorded thereon, a control magnetic read head having an air gap wider than the track and extending laterally beyond both edges of the track for producing a control signal in response to the signal recorded on the control track that does not vary with small lateral variations in track position, and means combining the control signal and average signal to compensate for variations in the magnitude of the average signal caused by changes in the velocity of the moving member.

4. Apparatus for detecting variations in an edge of a surface of a moving member, comprising:

a magnetic recording track on the surface of the moving member having an alternating signal recorded thereon, an edge of the recording track being coincident with an edge of the moving member;

guide means for guiding an edge of the moving member;

a plurality of magnetic sensor means, each sensor means extending laterally over a limited portion of the width of the recording track and extending beyond the coincident edge surface of the moving member for producing an electrical signal in response to the signal recorded on the recording track, the amplitude of the electrical signal being proportional to the portion of the recording track passing thereunder;

and means for summing the plurality of electrical signals to produce a signal, variations in the magnitude of which are indicative of variations in the edge surface of the moving member.

5. Apparatus for detecting variations in an edge of a surface of a moving member having an alternating signal recorded on a magnetic recording track an edge of which is aligned with the edge of the surface of the moving member, comprising:

guide means for guiding the edge of the surface of the moving member;

a pluraity of closely spaced magnetic read heads, each read head having an air gap extending over a portion of the recording track and overlapping the aligned edge thereof for producing an electrical signal in response to the signal recorded on the recording track;

a control magnetic recording track disposed along the surface of the moving member and having an alternating signal recorded thereon;

a control magnetic read head having an air gap extending over the control track for producing a control signal in response to the signal recorded on the control track;

division means responsive to the control signal for compensating for variations in the electrical signals caused by changes in the velocity of the moving member;

and means for summing the electrical signals to produce a sum signal in response to variations in the edge of the moving member.

6. Apparatus for detecting variations in the width of a moving member, comprising:

first and second magnetic recording tracks on the moving member having an alternating signal recorded thereon, an edge of the first recording track being coincident with one edge of the moving member while an edge of the second recording track is coincident with an opposite edge of the moving member;

first magnetic sensor means extending laterally over a portion of the first recording track and extending beyond the coincident edge of the moving member for producing a first electrical signal in response to the signal recorded on the first recording track, the amplitude of the first signal being proportional to the portion of the first recording track passing under the first sensor means;

second magnetic sensor means aligned with the first sensor means and extending laterally over a limited portion of the second recording track and extending beyond the coincident edge of the moving member for producing a second electrical signal in response to the signal recorded on the second recording track, the amplitude of the second signal being proportional to the portion of the second recording track passing under the second sensor means;

and means for combining the first and second electrical signals to produce a sum signal, variations in the magnitude of which provide an accurate indication of variations in the width of the moving member.

7. The apparatus defined in claim 6 including a third magnetic recording track disposed along a surface of the moving member and having an alternating signal recorded thereon;

third magnetic sensor means positioned over the third recording track to produce a control signal in response to the signal recorded on the third recording track;

and division means responsive to the control signal for compensating for variations in the first and second electrical signals caused by variations in velocity of the moving member.

8. Apparatus for detecting variations in the width of a moving member, comprising:

first and second magnetic recording tracks on the moving member having an alternating signal recorded thereon, the first recording track having an edge coincident with one edge of the moving member and the second recording track having an edge coincident with an opposite edge of the moving member;

a first plurality of closely spaced magnetic read heads, each having an air gap extending laterally over a limited portion of the first recording track and extending beyond the coincident edge thereof for producing a first plurality of electrical signals in response to the signal recorded on the first magnetic recording track;

a second plurality of closely spaced magnetic read heads, each having an air gap extending laterally over a limited portion of the second recording track and extending beyond the coincident edge thereof for producing a second plurality of electrical signals in response to the signal recorded on the second magnetic recording track, the magnetic heads of the second plurality of magnetic heads being aligned opposite to the magnetic heads of the first plurality of magnetic heads;

and means for combining the first and second plurality of electrical signals to produce a resultant electrical signal, variations in the magnitude of which are an accurate indication of variations in the width of the moving member.

9. The apparatus defined in claim 8 including a third magnetic recording track disposed along a surface of the moving member and having an alternating signal recorded thereon;

a magnetic read head having an air gap disposed over the third recording track for developing a control signal in response to the signal recorded on the third track;

and divider means for dividing the resultant signal by the control signal to compensate for variations in the resultant signal caused by variations in velocity of the moving member.

10. Apparatus for detecting variations in the straightness of a moving member, comprising:

first and second magnetic recording tracks on the moving member having an alternating signal recorded thereon, the first recording track having an edge coincident with one edge of the moving member and the second recording track having an edge coincident with an opposite edge of the moving member;

a first plurality of closely spaced magnetic read heads, each having an air gap extending laterally over a limited portion of the first recording track and extending beyond the coincident edge thereof for producing a first plurality of electrical signals in response to the signal recorded on the first recording track;

a second plurality of closely spaced magnetic read heads, each having an air gap extending laterally over a limited portion of the second recording track and extending beyond the coincident edge thereof for producing a second plurality of electrical signals in response to the signal recorded on the second recording track, the magnetic heads of the second plurality of magnetic heads being aligned opposite to the magnetic heads of the first plurality of magnetic heads;

a third magnetic recording track disposed along a surface of the moving member and having an alternating signal recorded thereon;

a magnetic read head having an air gap disposed over the third track to produce an electrical control signal in response to the signal recorded on the third track;

division means responsive to the electrical control signal for compensating for variations in the magnitude of the first and second plurality of electrical signals due to variations in speed of the moving member;

and means for receiving the first and second plurality of electrical signals for developing an output signal, variations in the magnitude of which provide an accurate indication of variations in the straightness of the moving strip.

11. Apparatus for detecting variations in the width and straightness of a moving member, comprising:

first and second magnetic recording tracks on the moving member having an alternating signal recorded thereon, the first recording track having an edge coincident with one edge of the moving member and the second recording track having an edge coincident with an opposite edge of the moving member;

first magnetic sensor means extending laterally over a limited portion of the first recording track and extending beyond the coincident edge thereof for producing a first electrical signal in response to the signal recorded on the first recording track;

a second magnetic sensor means aligned opposite the first sensor means and extending laterally over a limited portion of the second recording track and extending beyond the coincident edge thereof for producing a second electrical signal in response to the signal recorded on the second recording track;

summing means for adding the first and second electrical signals to produce a first output signal, variations in the magnitude of which provide a direct indication of the variations in the width of the moving member;

and means for subtracting the first and second electrical signals to produce a second output signal variations in the magnitude of which provide a direct indication of variations in the straightness of the moving member.

12. The apparatus defined in claim 11 including a third magnetic recording track disposed along the moving member and having an alternating signal recorded thereon;

third magnetic sensor means extending over the third track to produce an electrical control signal in response to the signal recorded on the third track;

and division means responsive to the electrical control signal for compensating for variations in the magnitude of the first and second electrical signals caused by variations in the velocity of the moving member.

13. Apparatus for detecting variations in the width and straightness of a moving member having first and second alternating signals recorded on first and second magnetic recording tracks, the first recording track having an edge coincident with one edge of the moving member and the second recording track having an edge coincident with an opposite edge of the moving member, comprising:

a first plurality of closely spaced magnetic heads each having an air gap extending laterally over a limited portion of the first recording track and extending beyond the coincident edge thereof for producing a first plurality of electrical signals in response to the signal recorded on the first recording track;

a second plurality of closely spaced magnetic read heads each having an air gap extending laterally over a limited portion of the second recording track and extending beyond the coincident edge thereof for producing a second plurality of electrical signals in response to the signal recorded on the second recording track;

a third magnetic recording track extending along a surface of the moving member and having an alternating signal recorded thereon;

a magnetic read head having an air gap extending over the third track for producing an electrical control signal in response to the signal recorded on the third track;

means for adding the first and second plurality of electrical signals to produce a sum signal variations in the magnitude of which are proportional of variations in the width of the moving member;

division means responsive to the electrical control signal and the output of the adding means for compensating for variations in the amplitude of the first and second plurality of electrical signals caused by variations in the velocity of the moving member;

and means for subtracting the first and second plurality of electrical signals to develop an output signal variations in the magnitude of which are proportional to variations in the straightness of the moving strip.

References Cited by the Examiner

UNITED STATES PATENTS

| | | | |
|---|---|---|---|
| 2,937,239 | 5/1960 | Garber | 179—100.2 |
| 2,937,366 | 5/1960 | Sims | 179—100.2 |

WALTER L. CARLSON, *Primary Examiner.*

RICHARD B. WILKINSON, *Examiner.*

F. A. SEEMAR, R. J. CORCORAN, *Assistant Examiners.*

UNITED STATES PATENT OFFICE
CERTIFICATE OF CORRECTION

Patent No. 3,278,838 October 11, 1966

Michael I. Behr et al.

It is hereby certified that error appears in the above numbered patent requiring correction and that the said Letters Patent should read as corrected below.

Column 6, lines 27 and 28, strike out "one alternating signal recorded thereon, an edge of the recording" and insert instead -- an alternating signal recorded thereon, one edge of the recording --.

Signed and sealed this 5th day of September 1967.

(SEAL)
Attest:

ERNEST W. SWIDER
Attesting Officer

EDWARD J. BRENNER
Commissioner of Patents